Jan. 18, 1966   G. R. OLSON   3,229,808
CONVEYOR CHAIN CLEANING DEVICE
Filed March 25, 1964

INVENTOR
GENE R. OLSON
BY
ATTORNEY 3,229,808
CONVEYOR CHAIN CLEANING DEVICE
Gene R. Olson, 155 N. 120th St., Milwaukee, Wis.
Filed Mar. 25, 1964, Ser. No. 354,555
5 Claims. (Cl. 198—229)

My invention relates to a conveyor chain cleaning device and more particularly to a device having brushes for removing foreign matter from the links of such a chain.

It is manifest to anyone familiar with overhead conveyors consisting of continuous chains suspended by carriages, or the like, on a rigidly mounted track, that the conveyor chain supporting the products, or materials, is subject to being coated with foreign matter, as the products are passed through spray booths, tanks, or the like, and, after continuous use, the conveyor chain becomes coated with matter that may drip, or build up onto the surface of the chain, creating harmful effects. Thus, it is the primary object of my invention to provide a rotary brush cleaning apparatus that may be mounted on a conveyor rail so as to efficiently remove this foreign matter from the chain links.

A related purpose of my invention is to provide a chain cleaning device that may be mounted on a chain conveyor rail and has brushes which straddle the chain and can be adjusted both vertically and laterally for engagement with the chain links.

Another object is to provide a device of the character described that may be adjusted to clean various sizes of chains, to exert varying amounts of pressure and to use various sizes of brushes.

A further object of the invention is to provide a device having brush guards that may be adjusted vertically and laterally in accordance with the positioning of the brushes.

Other and further objects of my invention will become more apparent as the description proceeds, when taken in conjunction with the drawings, in which.

Figure 1:
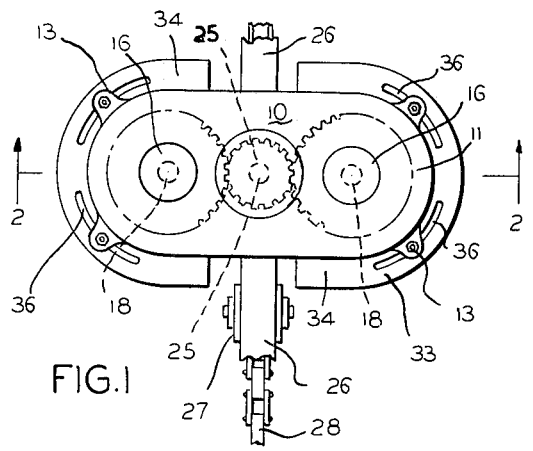
FIGURE 1 is a plan view of the entire unit constituting my invention, mounted on an I beam rail.

Similar characters of reference indicate corresponding parts throughout the several views, and referring specifically now to the same, the character 10 designates generally a housing having an upper portion 11 and a lower portion 12. Each portion has similar outwardly extending ears 13 containing apertures 14. The sections are put together with the ears and apertures in register.

The upper portion 11 of the housing supports an electric motor 15. Integral with the housing and spaced on opposite sides of the motor are a pair of hollow cylindrical projection 16 which receive bearings (not shown). The lower portion 12 of the housing also has a pair of hollow cylindrical projections 17 integral therewith to receive and hold bearings (not shown).

A shaft 18 is journaled within the bearings located in each of the projections 16 and 17 and extends downwardly of the housing to receive and support a disc-shaped brush 19. The shafts 18 are equipped with longitudinal keyways 20 to enable the hubs 21 of the brushes to be fastened to the shafts to prevent rotation of the brushes relative to the shafts. Locking of the brushes to prevent vertical movement relative to the shafts is accomplished by means of collars 22 which slide over the shafts above and below the hubs 21 and are fastened to the shafts by screws 22a.

Figure 4:
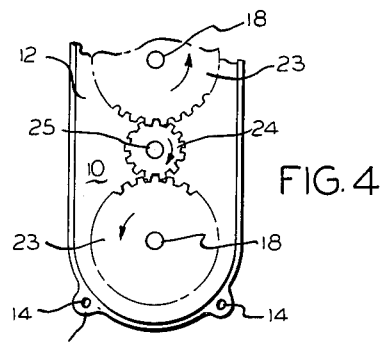
FIGURE 4 is a fragmentary view of the gear and pinion arrangement taken at the line 4—4 of FIGURE 2.
Figure 2:
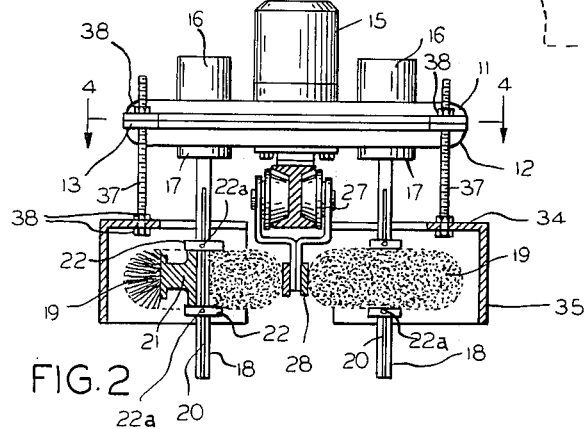
FIGURE 2 is a cross-sectional view of the apparatus taken along line 2—2 of FIGURE 1.

Within the housing 10 and affixed to the shafts 18 are spur gears 23 (see FIGURE 4) which are driven by a pinion 24 mounted on a shaft 25 connected to the motor 15. Rotation of the pinion will rotate the spur gears, shafts and brushes.

The apparatus is mounted on a plate 31 which is affixed, as by welding, to the top surface of an I shaped conveyor rail 26. A carriage 27 rides on the flanges of this rail and supports the conveyor chain 28.

Figure 5:
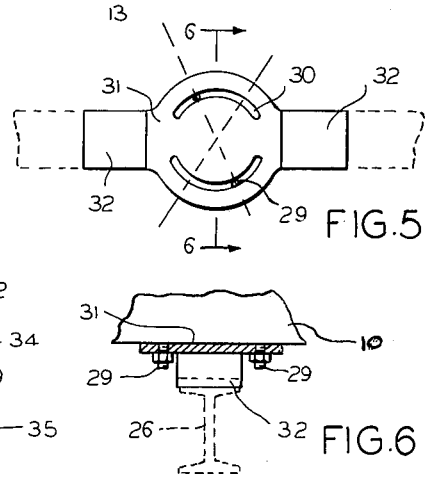
FIGURE 5 is a plan or top view of the mounting plate showing the arcuate slots for angular adjustment of the apparatus relative to the rail.
Figure 6:
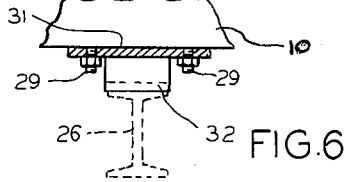
FIGURE 6 is a cross-sectional view of the mounting plate shown in FIGURE 5 and taken at the line 6—6 therein.
Figure 3:
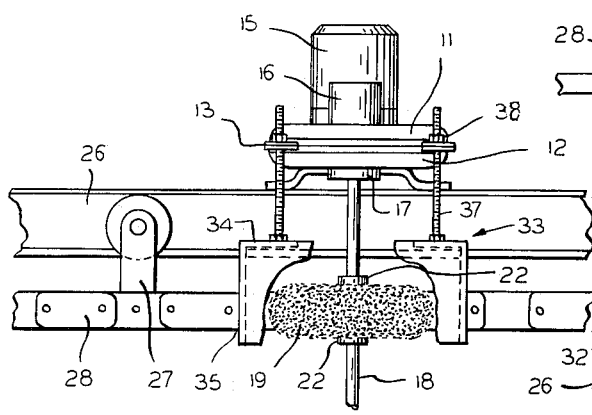
FIGURE 3 is a side elevational view of the apparatus mounted on an I beam rail with a brush guard broken away to show the brush.
Figure 7:
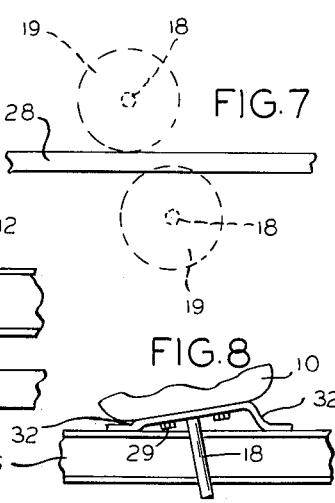
FIGURE 7 is a diagrammatic view showing the positions of adjustments for the brushes to insure contact with the conveyor chain.

The housing 10 (see FIGURES 5 and 6) is attached to the plate 31 by means of bolts 29 which fit into arcuate slots 30 in the plate. The plate has legs 32 which rest on the top surface of the I beam rail. The arcuate slots 30 permit the housing 10 to be angularly adjusted relative to the plate and the rail (see FIGURE 7) to move the brushes toward and away from the conveyor chain so as to enable the apparatus to be used with chains and brushes of various sizes. This also compensates for wear on the brushes.

Figure 8:
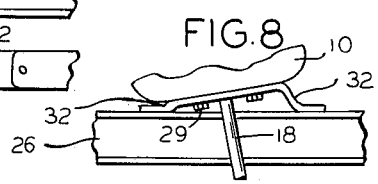
FIGURE 8 shows a modified from of the plate for mounting the plate with the brushes extending obliquely to the rail.

One leg 32 of the plate 31 (see FIGURE 8) may be made shorter than the other leg to enable the plate and the housing 10 to be affixed to the rail in a position tilted longitudinally of the rail. With the housing in this position, the shafts 18 and brushes 19 will extend obliquely to the rail and chain so that the brushes will engage the chain with a sweeping movement projecting transversely of the path of travel of the chain for better cleaning action.

A guard 33 is provided for each brush and is designed to fit over the top and the sides of the brush which are located outwardly of the conveyor chain and rail. Each guard is constructed from an inverted angle iron bent in the shape of a U to fit around the portions of the brush which do not face the rail. The angle iron has a top horizontal flange 34 and a vertical side flange 35. A pair of arcuate shaped slots 36 are located in the top flange of each guard to receive supporting rods 37 which extend from and are fastened to the housing 10 through the apertures 14 in the ears 13. The rods are threaded throughout a considerable portion of their length to permit the guards to be secured thereto in a variety of longitudinal positions. Nuts 38 are threaded on the rods above and below the flange portion 34 to fasten the guards in position. The arcuate slots in the guards permit lateral movement of the guards relative to the bolts and the housing so that the axis of the U-shaped guard can be maintained normal to the chain as the housing is turned. Thus, the guards can be positioned to protect the portions of the brushes not facing the chain as the housing is turned relative to the rail.

Because the housing supporting the brushes can be rotated relative to the rail, a cleaner of this type of one size can be used on chain type conveyors of various widths and can also be adjusted for various spacings between the rail and the conveyor chain. This design also permits the use of brushes of varying shapes and diameters. The apparatus can be adjusted angularly with respect to the rail simply by the manipulation of a pair of bolts. The vertical adjustment of each brush can also be rapidly made by the manipulation of a pair of screws. Thus, the brushes can be rapidly and easily adjusted both laterally and vertically once the housing is mounted on the rail. Additionally, the guards can be adjusted horizontally and laterally as the brushes are moved.

Whereas I have shown and described an operative form of the invention, it should be understood that this showing and description thereof should be taken in an illustrative or diagrammatic sense only. There are many modifications in and to the invention which will fall within the scope and spirit thereof and which will be apparent to those skilled in the art. The scope of the invention should be limited only by the scope of the hereinafter appended claims.

I claim:

1. A power driven brush apparatus for cleaning the links of a conveyor chain and adapted to be mounted on a rail supporting the chain including a mounting plate formed and adapted to be positioned on the top surface of said conveyor rail, a housing carried by said plate and dimensioned to extend laterally beyond the sides of said conveyor rail, an electric motor mounted on said housing and connected to a drive gear located in the housing, driven gears journaled in the housing and positionable on each side of said rail and engaged with said drive gear, a shaft extending vertically and downwardly from each of said driven gears and having a brush mounted thereon, each of said brushes being slidable along said shaft and releasably lockable to said shaft in a plurality of positions, and means for adjustably connecting said plate and housing to permit unitary rotation of said housing, and elements carried thereby about a point on said plate to thereby allow simultaneous movement of said brushes toward and away from said rail.

2. An apparatus for cleaning the links of a chain conveyor and adapted to be mounted on a rail supporting the chain comprising a plate formed and adapted to be affixed to the top surface of the conveyor rail, an elongated housing supported by said plate and dimensioned to extend laterally beyond the sides of said conveyor rail, means connecting said housing and said plate to permit the housing to be fastened to the plate in a plurality of angular positions relative to the rail, an electric motor mounted on said housing and connected to a drive gear located in the housing, driven gears positioned in the housing and positionable on each side of said rail and meshed with said drive gear, a shaft extending vertically and downwardly from each of said driven gears and having a brush mounted thereon, each of said brushes being slidable along its shaft and lockable to said shaft in a plurality of positions along the length of the shaft, and a guard for each brush suspended from said housing and adjustable in vertical and lateral relation thereto.

3. An apparatus for cleaning the links of a conveyor chain comprising a plate having a pair of legs formed and adapted to be affixed to the top surface of a rail supporting the chain to position the plate above said rail, a housing mounted on and attached to said plate and dimensioned to extend laterally beyond the sides of said rail, means connecting the housing and the plate for aligning the housing in a plurality of angular positions relative to said rail, power driven shafts mounted in said housing on each side of said plate and extending vertically and downwardly therefrom, while being positionable alongside both sides of said rail, said housing including power means connected to each shaft for rotation thereof, and a brush slidably mounted on each shaft and releasably lockable to each shaft in a plurality of positions along the length thereof, said housing being adjustable through said angular positions to move said brushes simultaneously into engagement with the sides of the conveyor chain.

4. An apparatus of the type described in claim 3 in which one leg of the plate is shorter than the other leg to enable the plate to be affixed to the rail in a position inclined longitudinally thereof.

5. An apparatus for cleaning a rail-supported conveyor chain including supporting means formed and adapted to be mounted on said rail and dimensioned to extend outwardly beyond the sides of the rail, rotatable shafts mounted in said means and positionable on each side of said rail to thereby project alongside each side of a chain carrying portion of said rail, a brush mounted on each shaft for rotation therewith, said supporting means including means for mounting said shafts at a fixed distance from one another while permitting a simultaneous adjustment of both shafts and their associated brushes toward and away from said rail, and means associated with said supporting means to rotate said shafts.

References Cited by the Examiner

UNITED STATES PATENTS

| | | | |
|---|---|---|---|
| 418,728 | 1/1890 | Lawrence | 198—230 |
| 584,238 | 6/1897 | Reagan | 198—230 |
| 766,013 | 7/1904 | Baldwin | 198—230 |
| 866,704 | 9/1907 | Witt | 198—230 |
| 1,111,752 | 9/1914 | Lichtenstein et al. | 198—229 |

HUGO O. SCHULZ, Primary Examiner.

SAMUEL F. COLEMAN, Examiner.

R. M. WALKER, Assistant Examiner.